United States Patent [19]

Höfling

[11] Patent Number: 4,635,783

[45] Date of Patent: Jan. 13, 1987

[54] PERSON-CONVEYING DEVICE

[75] Inventor: Peter Höfling, Dortmund, Fed. Rep. of Germany

[73] Assignee: O&K Orenstein & Koppel Aktiengesellschaft, Dortmund, Fed. Rep. of Germany

[21] Appl. No.: 713,942

[22] Filed: Mar. 20, 1985

[30] Foreign Application Priority Data

Apr. 3, 1984 [DE] Fed. Rep. of Germany ....... 3412350

[51] Int. Cl.[4] .............................................. B66B 23/00

[52] U.S. Cl. .................................... 198/321; 198/332; 198/838; 198/845

[58] Field of Search ............... 198/321, 332, 845, 327, 198/326, 328, 838, 329

[56] References Cited

U.S. PATENT DOCUMENTS

| | | | |
|---|---|---|---|
| 1,288,196 | 12/1918 | Reno | 198/332 |
| 2,023,067 | 12/1935 | Dunlop | 198/329 |
| 2,231,709 | 2/1941 | Dunlop | 198/329 |
| 2,628,705 | 2/1953 | Kline et al. | 198/838 |
| 2,701,050 | 2/1955 | Steinborn | 198/845 |
| 3,144,118 | 8/1964 | Fabula | 198/326 |
| 3,191,743 | 6/1965 | Rissler et al. | 198/321 |
| 3,530,799 | 9/1970 | Braun | 198/321 |
| 3,767,033 | 10/1973 | Yamauchi et al. | 198/838 |
| 4,175,652 | 11/1979 | Satou et al. | 198/332 |
| 4,249,649 | 2/1981 | Kraft | 198/332 |
| 4,526,271 | 7/1985 | Finnighan | 198/845 |

FOREIGN PATENT DOCUMENTS

| | | | |
|---|---|---|---|
| 628965 | 4/1936 | Fed. Rep. of Germany | 198/328 |
| 1135637 | 8/1962 | Fed. Rep. of Germany | 198/332 |
| 1809976 | 6/1970 | Fed. Rep. of Germany | 198/332 |
| 2703297 | 8/1977 | Fed. Rep. of Germany . | |
| 2223823 | 3/1979 | Fed. Rep. of Germany | 198/326 |
| 54-138294 | 10/1979 | Japan | 198/332 |
| 55-40104 | 3/1980 | Japan | 198/838 |
| 414101 | 8/1974 | U.S.S.R. | 198/845 |

*Primary Examiner*—Robert J. Spar

*Assistant Examiner*—Daniel R. Alexander

*Attorney, Agent, or Firm*—Martin A. Farber

[57] ABSTRACT

Person-conveying device of quiet operating design having a step-belt or pallet belt which is guided in guide rails by transport chains with step-chain or pallet-chain rollers as well as chain-guide rollers, the points of contact of the step-chain or pallet-chain rollers with the travel surface being spaced from the lateral guide surface of the guide rail.

8 Claims, 4 Drawing Figures

5
4
8
7a
7b
11
20
3
10
2
13
19
18
6a
6b
4
8
12
9

2
3
4
1
5

5
4
8
7a
7b
11
20
3
10
2
13
19
18
6a
6b
4
8
12
9

PERSON-CONVEYING DEVICE

FIELD AND BACKGROUND OF THE INVENTION

The present invention refers to a person conveying device of quiet operating design having a step belt or pallet belt which is guided in guide rails by transport chains with step-chain or respectively pallet-chain rollers as well as chain-guide rollers.

Quietly operating designs of person-conveying devices, whether they be escalators or moving walkways, are obtained if the step or palette drive pins connected with the tread elements have step-chain or respectively pallet-chain rollers which are mounted on ball bearings. The design of such rollers must provide assurance of controlled transfer of force from the ball bearing to the plastic travel surface of the roller.

In a device of the type described above, the object of the invention is to assure a dependably operating and nevertheless inexpensive transfer of the loading forces on the step belt or respectively pallet belt to the guide rail of its tread elements.

SUMMARY OF THE INVENTION

According to the invention the travel-surface contact of the step-chain or respectively pallet-chain rollers is spaced from the lateral guide surface of the guide rail. This result can be obtained in the manner that the rollers have a smaller width in the region of the travel surface than in the region of the central shoulder, either by a reduction in width between the two regions on at least one side or else a symmetrical reduction in width on both sides.

In another embodiment of the solution in connection with the above-described device, the chain-guide rollers with lateral guide surface contact have a smaller outside diameter than the step-chain or respectively pallet-chain rollers.

As a result of the measures described above, the loading forces on the step or pallet belt of the person-conveying device, broken down into their predominantly vertical and horizontal components, are transmitted by different types of rollers of different development, on the one hand, to the travel surface of the guide rail and, on the other hand, to the lateral guide surface of the latter.

The advantage obtained by differently shaped transmission members, the step-chain or respectively pallet-chain rollers on the one hand and the chain-guide rollers on the other hand, of having to transfer also only predominantly in each case one component of the load, whether it be the vertical or the horizontal, to the guide rail makes it possible for the ball bearings of the step-chain or pallet-chain pins to be embedded directly, i.e. without further auxiliary transmission members, in the plastic of the roller. They can therefore be either cast directly in the plastic or be impressed later on into a recess in the plastic form of the roller. As plastic there can be used for this purpose, for instance, a polyurethane which, due to its having a certain amount of deformability, furthermore also travels very quietly on the travel surface of the guide rail.

The chain-guide rolls which are not connected directly with the tread elements but travel on chain pins, supported by plain bearings, in the chain, are customarily made of a polyamide plastic of hard consistency. They serve for the guiding of the chain predominantly in horizontal direction and therefore their side surfaces are in rolling contact with lateral guide surfaces of the guide rail. In order further to increase the quietness in operation, the outside diameter of these rollers can be made smaller than that of the step-chain or respectively pallet-chain rollers since, in contradistinction to the latter, they do not have to transmit vertical loading forces of the tread elements. In such case, however, this leads to a further increase in the quietness of the transport chain and thus of the person-conveying device.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
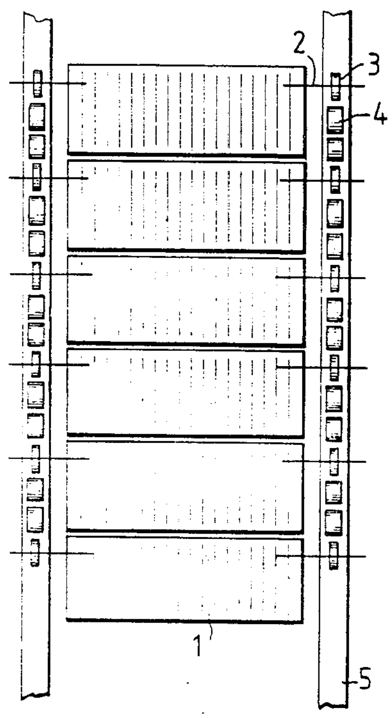
FIG. 1 is a top view of a step or pallet belt.

As shown in FIG. 1, the tread plates 1 of a step or pallet belt are guided in guide rails 5, the vertical loading forces on each tread plate 1 of the step or pallet belt being transmitted via driver pins or bolts 2 and step or respectively pallet chain rollers 3 to the travel surface of the guide rail 5. The chain guide rollers 4 can also be noted.

Figure 2:
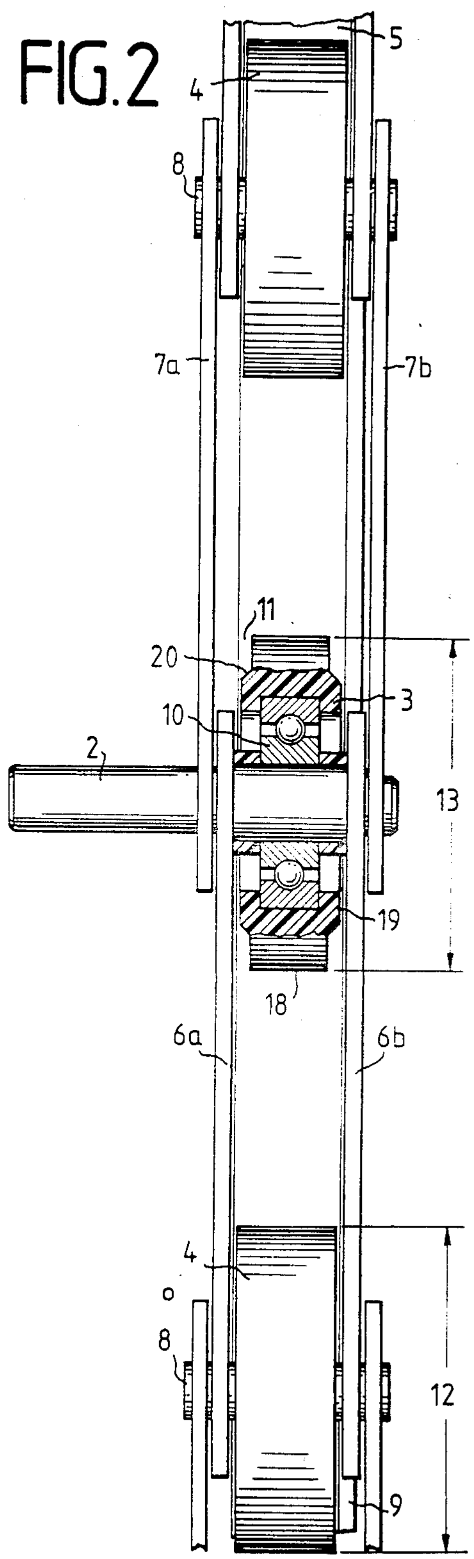
FIG. 2 shows a portion of a transport chain with chain rollers.

The partial showing in FIG. 2 shows more clearly the installation of the step or respectively pallet chain rollers 3 and of the chain-guide rollers 4 between the inner plates *6a* and *6b* and the outer plates *7a* and *7b* respectively of a transport chain. The step or respectively pallet chain rollers 3 have as their travel axles the driver pins 2 of each tread plate 1, and the chain guide rollers 4 are mounted on the chain pins 8 of the transport chain. From the figure it can be noted that the step-chain or respectively pallet-chain rollers 3 are at their travel-surface contact on the guide rail 5 spaced a distance from lateral guide surfaces 9 of the guide rail 5. The figure furthermore shows that the ball bearings 10 of the step-chain or respectively pallet-chain rollers 3 are in direct contact with the plastic material of the chain rollers.

It is also clear from the figure that the chain-guide rollers 4 travel with lateral guide-surface contact on the guide surface 9 of the guide rail 5 and have a smaller outside diameter 12 than corresponds to the diameter 13 of the step-chain or respectively pallet-chain rollers 3. As shown in the drawing, the step-chain or respectively pallet-chain rollers 3 are of a smaller width in the travel-surface region 18 than in the central shoulder region 19. In accordance with the development pursuant to the invention, a reduction in width 20 is provided on at least one side. There has not been shown, but can easily be understood a further embodiment in which one side of the step-chain or respectively pallet-chain rollers is flat and a reduction in width 20 is provided only on one side, or else the same result is obtained by a continuously inclined plane.

Figure 3A:
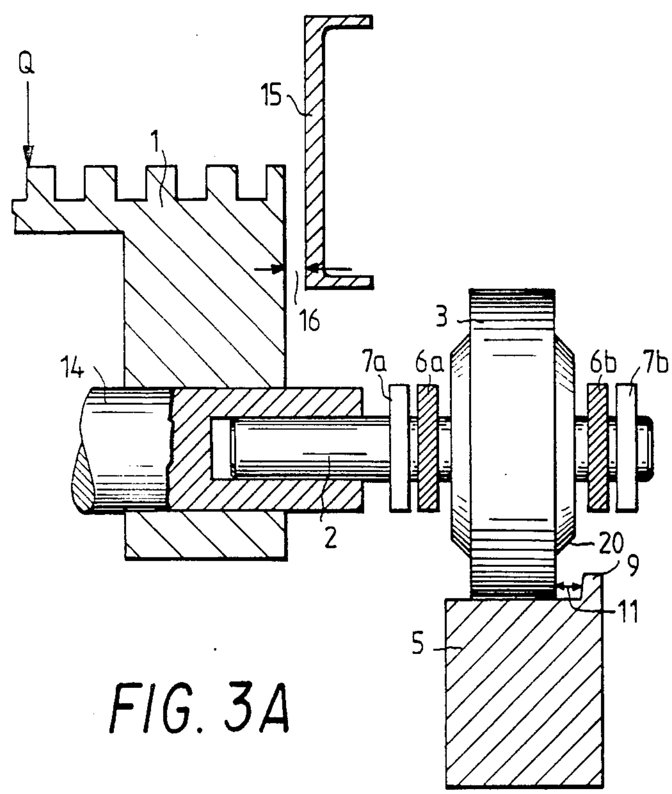
FIGS. 3A and 3B are cross-sectional views showing positions of the rollers on the guide rail.

FIG. 3A shows, from a different view, the position of the step-chain or respectively pallet-chain rollers 3 on the guide rail 5; here the distance 11 from the lateral guide surface 9 of the guide rail 5 can be clearly noted.

In addition to the elements already mentioned, it can be seen that the vertical loading forces Q on each tread plate 1 act via a shaft 14, a driver pin 2 and the step-chain or respectively pallet-chain rollers 3 on the travel surface of the guide rail 5. In order to make the conditions clear, a balustrade 15 has also been shown with a clearance distance 16.

Figure 3B:
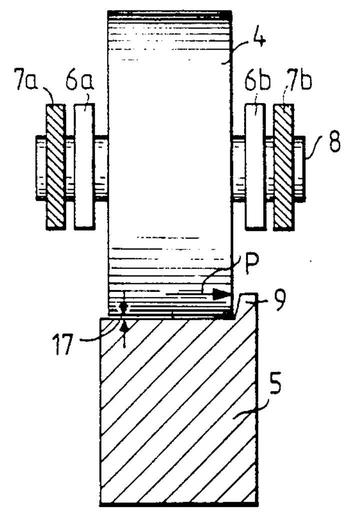

FIG. 3B shows the corresponding conditions for the chain-guide rollers 4, which travel in contact with the lateral guide surface 9 of the guide rail 5. In this way it is possible to introduce the horizontal loading forces P of the tread plates 1 and the chain-guidance forces into the guide rail 5.

If, in accordance with a further embodiment of the invention, the chain-guide rollers 4 are provided with a smaller outside diameter 12 than the diameter 13 of the step-chain or respectively pallet-chain rollers 3, then a slight clearance 17, corresponding to the difference in diameters, can temporarily be produced between the chain-guide roller 4 and the surface of the guide rail 5.

What is claimed is:

1. In a person-conveying device of quiet operating design having a belt comprising tread plates, each tread plate being guided, via a respective driver pin, on a guide rail having a planar travel surface and a lateral guide surface, by transport chains comprising rollers between plates of the transport chains, the improvement wherein said rollers contact said travel surface, said rollers comprise load supporting chain rollers and chain-guide rollers, each of said load supporting chain rollers is mounted on a respective said driver pin, each of said load supporting chain rollers has a smaller width in the region of said travel surface than said chain-guide rollers whereby a side surface of said load supporting chain rollers is spaced by a distance from said lateral guide surface of the guide rail, and said chain-guide rollers laterally contact said lateral guide surface.

2. The device according to claim 1, wherein said load supporting chain rollers comprise a central shoulder and have a smaller width in the region of said travel surface than in the region of said central shoulder.

3. The device according to claim 2, wherein said loading supporting chain rollers on at least one side thereof are laterally offset between said central shoulder region and the region of said travel surface defining said smaller width in the region of said travel surface than in the region of said central shoulder.

4. The device according to claim 1, wherein said belt is a step belt.

5. The device according to claim 1, wherein said belt is a pallet belt.

6. The device according to claim 1, wherein said load supporting chain rollers are made of plastic material and include ball bearings mounted on said driver pin and directly contact said plastic material.

7. The device according to claim 1, wherein said chain-guide rollers have a smaller diameter than that of said chain rollers.

8. The device according to claim 1, wherein said side surface of said load supporting chain rollers are spaced on the same side from said lateral guide surface of said guide rail.

* * * * *